United States Patent [19]
Anthony

[11] 3,944,181
[45] Mar. 16, 1976

[54] ELASTOMERIC POST ARRAY MOUNTING STRUCTURE

[75] Inventor: Philip L. Anthony, Westminster, Calif.

[73] Assignee: Rockwell International Corporation, El Segundo, Calif.

[22] Filed: Aug. 9, 1974

[21] Appl. No.: 496,222

[52] U.S. Cl............................ 248/358 R; 248/22
[51] Int. Cl.²........................................ F16F 15/04
[58] Field of Search............ 248/358 R, 350, 15, 18, 248/20, 21, 22; 52/346, 347, 403; 33/350, 324; 339/94 R, 94 C; 267/141, 153

[56] References Cited
UNITED STATES PATENTS

| | | | |
|---|---|---|---|
| 2,408,856 | 10/1946 | Hussman.............................. | 248/22 |
| 3,083,259 | 3/1963 | Wells................................... | 248/22 |
| 3,105,697 | 10/1963 | Weaver et al........................ | 248/22 |
| 3,275,131 | 9/1966 | Erickson.............................. | 248/22 |
| 3,436,042 | 4/1969 | Goubergen.......................... | 248/22 |
| 3,544,415 | 12/1970 | Price et al........................... | 248/22 |
| 3,679,159 | 7/1972 | Bach et al........................... | 248/22 |
| 3,727,870 | 4/1973 | Bass.................................... | 248/350 |

Primary Examiner—Roy D. Frazier
Assistant Examiner—Robert A. Hafer
Attorney, Agent, or Firm—H. Fredrick Hamann; Rolf M. Pitts; George Jameson

[57] ABSTRACT

An elastomeric post array mounting structure for mounting any suitable dimensionally critical or precision instrument so as to minimize the transmission of detrimental external stresses to dimensionally critical parts of the instrument where, in a preferred embodiment, an array of elastomeric posts are attached at first ends to a surface of a rigid support section and at second ends to a mateable surface of the instrument being mounted.

7 Claims, 3 Drawing Figures

3,944,181

ELASTOMERIC POST ARRAY MOUNTING STRUCTURE

BACKGROUND OF THE INVENTION

1. Field of the Invention

This invention relates to means for mounting a ring laser gyroscope or other precision inertial or optical instrument, and particularly to a means for mounting such a precision instrument to minimize the transmission of detrimental stresses to dimensionally critical parts of the instrument.

2. Description of the Prior Art

Some of the prior art techniques for mounting precision instruments, such as ring laser gyroscopes, utilize metallic attachments by hard surface mounting, hard point mounting or spring mounting. Each of these techniques suffers from the disadvantages of transmitting stresses which can cause a distortion of the critical ring laser gyroscope structure and/or does not provide sufficient support for higher acceleration or vibration environments. A detrimental distortion of the ring laser gyroscope structure can arise from mechanical stresses in the mount attachment itself, as well as from external thermal, accelerational or vibrational effects transmitted through the mounting structure. Experience has shown that whenever a ring laser gyroscope structure is hard mounted, there is sufficient distortion of the structure to degrade performance. In a hard-mounted structure mounting stresses, and hence performance, can also vary with environmental changes. Whenever a ring laser gyroscope, or other precision instrument, is mounted for operation by the use of a metallic spring mounting, stresses are not transmitted so readily. However, the metallic spring mounting is less able than one of the hard-mounted techniques to resist acceleration or vibrational inputs and tends to be sensitive to spatial orientation.

In using any of the above-described prior art mounting techniques even a very small dimensional change in one of the critical parts of a mounted precision instrument can adversely affect the instrument. A ring laser gyroscope, for example, is sensitive to very small changes in the relative positions of the mirrors which define the ring laser gyroscope optical cavity. To degrade gyroscope performance, the mirror positions need to change only enough to move the laser beam position a small fraction of a wavelength. Since the operational wavelength of the helium-neon laser in a typical ring laser gyroscope is approximately 25 microinches, a dimensional distortion of only a few microinches is detrimental. Thus, if the dimensionally critical structure of a ring laser gyroscope is compressed or stretched unsymmetrically by several microinches or warped or twisted through about one arcsecond, the points of incidence of the laser beams on the mirrors will be sufficiently shifted to degrade the operational performance of the ring laser gyroscope.

SUMMARY OF THE INVENTION

Briefly, a novel structure is provided for mounting a precision instrument to minimize the transmission of detrimental stresses to dimensionally critical parts of the instrument. In a preferred embodiment, an array of elastomeric posts are attached at first ends to a surface of a rigid support section and at second ends to a mateable surface of the instrument being mounted.

It is therefore an object of this invention to provide a novel structure for the ultra-low-stress mounting of any dimensionally critical instrument.

Another object of this invention is to provide an array of separate posts made out of an elastomeric material to suspend the body of a precision instrument or device to be mounted from a rigid support.

Another object of this invention is to provide first and second arrays of elastomeric posts for respectively mounting opposite side of a precision instrument or device to first and second rigid supports, respectively.

Another object of this invention is to provide a novel mounting structure for a precision device to prevent detrimental stresses from being transmitted to dimensionally critical parts of the device being mounted.

Another object of this invention is to provide a mounting technique which securely supports a delicate precision instrument without transmitting detrimental stresses thereto.

Another object of the invention is to provide a mounting structure which adequately supports a precision instrument in high acceleration and vibration environments.

A further object of this invention is to provide a novel, rugged, economical, light weight mounting structure for a precision instrument.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENT

Figure 1:
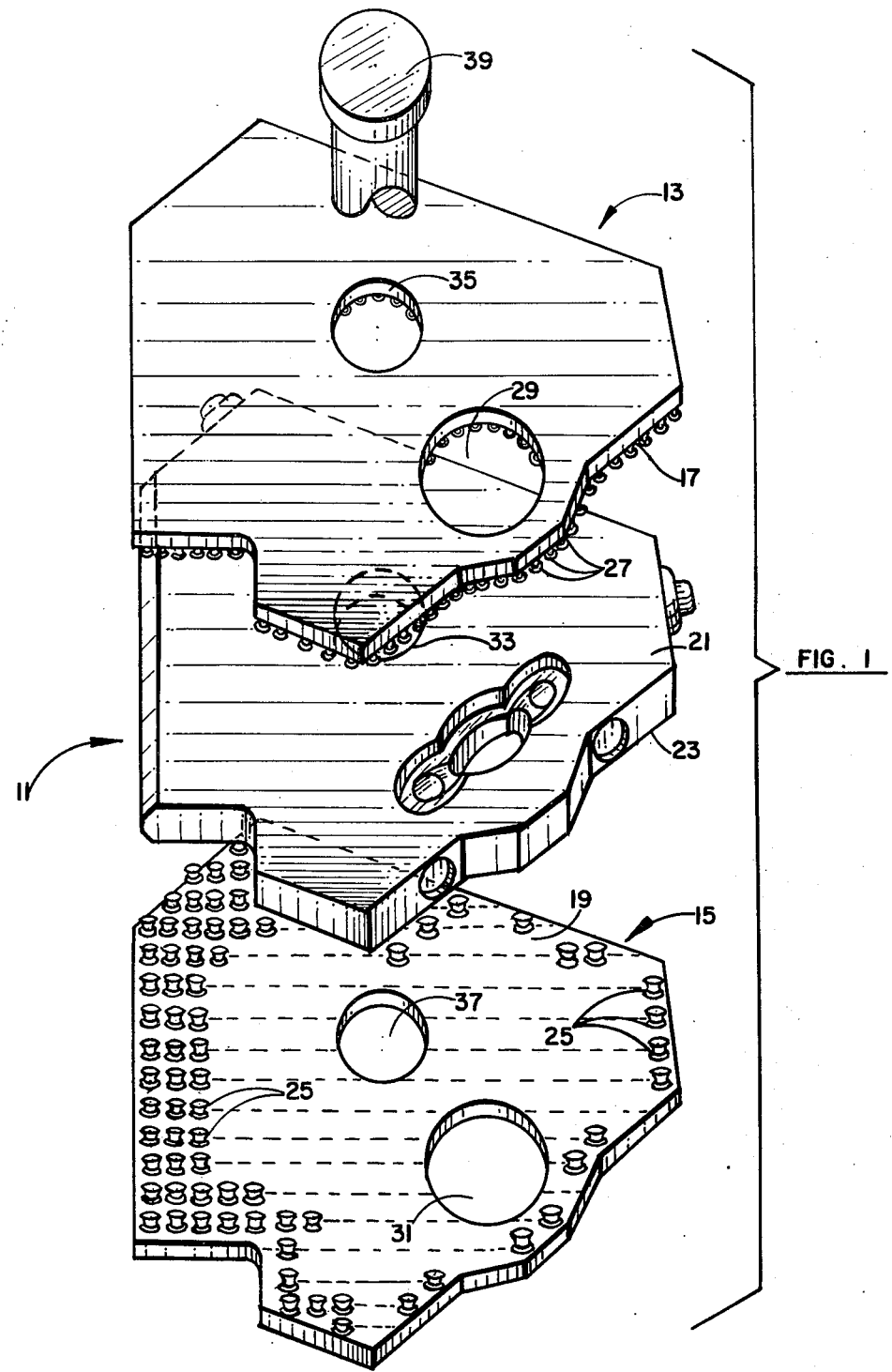
FIG. 1 is an isometric diagram illustrating an exemplary elastomeric post array mounting structure for mounting a ring laser gyroscope in accordance with a preferred embodiment of the invention.

Referring now to the drawings, FIG. 1 illustrates in isometric form an exemplary mounting structure in accordance with the invention for the ultra-low-stress mounting of a dimensionally critical instrument or device 11. While a ring laser gyroscope instrument or device is shown as the instrument 11 to be mounted, other dimensionally critical precision instruments or devices could be mounted, such as laser accelerometers, telescope mirrors, prismatic reflectors, optical instruments, inertial instruments, etc.

The illustrated mounting structure comprises rigid top and bottom support sections or plates 13 and 15 having bottom and top surfaces 17 and 19, respectively. The rigid support plates 13 and 15 can be made of, for example, a light metal such as beryllium or aluminum. In addition to providing support, the plates or sections 13 and 15 also provide a heat sink for the instrument 11. The surfaces 17 and 19 are respectively mateable with top and bottom surfaces 21 and 23 of the ring laser gyroscope 11. The surfaces 17 and 23 are not clearly visible since they are on the undersides of the section 13 and gyroscope 11, respectively. The illustrated configuration of the gyroscope 11 is such that each of the surfaces 21 and 23 are flat. As a result, the surface 17 is shown parallel to the surface 21, while the surface 19 is shown parallel to the surface 23. However, if the gyroscope 11 (or other instrument to be mounted) were configured to have non-flat or curved surfaces 21 and 23, the sections 13 and 15 would also be configured to have non-flat or curved surfaces 17 and 19 contoured to match or mate with the surfaces 21 and 23. The important thing in the embodiment shown in FIG. 1 is that the surfaces 17 and 19 respectively match the surfaces 21 and 23 of the instrument or device 11 to be mounted. It should however be realized that in other embodiments that non matching surfaces of one surface of an instrument and the associated opposing surface of a rigid support section could be utilized, as required, with the lengths of the posts in an array being of different lengths. For example, the surface of the instrument could be curved and the opposing surface of the rigid section straight, and vice-versa.

The bottom surface 23 of the dimensionally critical body of the gyroscope 11 is attached to the upper surface 19 of the rigid support section 15 by means of an array of elastomeric posts 25. One end of each post 25 in the array is bonded, or suitably attached, to the surface 19 of the rigid support section 15, and the other end of each post 25 is similarly bonded to the surface 23 of the gyroscope 11. Thus, the body of the gyroscope 11 is suspended from the rigid support section 15 by the array of elastomeric posts 25.

The utilization of all or part of the flat surface 23 of the body of the instrument 11 would be the simplest application of the elastomeric post array mounting technique. This would be sufficient for many cases since the supportive strength per unit of the elastomeric post array mounting is surprisingly high.

When additional support strength is required or a larger interface is needed for heat transfer, the top surface 21 of the instrument 11 can be attached to the bottom surface 17 of the rigid support section 13 by means of a second array of elastomeric posts 27. One end of each post 27 in the second array is bonded, or suitably attached, to the surface 17 of the rigid support section 13, and the other end of each post 27 is similarly bonded to the surface of the gyroscope instrument 11.

Access holes 29 and 31 are shown provided in the support sections 13 and 15, respectively, for adjusting the ring laser gyroscope 11. When the gyroscope 11 has a clearance hole 33 passing therethrough for mounting purposes, corresponding mounting holes 35 and 37 are inserted in the support sections 13 and 15 respectively. In this manner a mounting post 39 can be inserted through the holes 35, 33 and 37 to secure or fasten the assembly comprising the section 13, gyroscope 11 and section 15 to any desired substrate (not shown) by conventional means.

Although the rigid support sections 13 and 15 are shown as continuous fixed elements, it is also within the purview of this invention that either or both of them could comprise separated portions. Also, as indicated previously, either or both of the sections 13 and 15, along with the associated arrays of elastomeric posts 25 and 27 can also be attached to curved or non-flat surfaces (not shown) of the body of an instrument with the rigid support section or sections simply contoured to match the body surface.

One effect of the elastomeric post array mounting structure shown in FIG. 1 (as well as FIG. 2) is to distribute attachment forces applied thereto over large areas of the surface (e.g., 21 and/or 23) of the body of the instrument 11 to achieve ultra-low stress levels without any local stress concentrations on the body. Another effect is to absorb any dimensional changes in the surrounding rigid section or sections 13 and 15 due to thermal expansion, shock, acceleration or vibrations so that stresses transmitted to the body of the instrument 11 are greatly reduced.

Stress levels inherent in the mounting of the instrument 11 can be decreased by increasing the area of the post-array-body interface over which the attachment forces are distributed. If more support strength is required than that shown in FIG. 1 or a larger interface is needed for heat transfer, rigid supports could be attached to any number of surfaces on the body of the instrument 11 by way of additional elastomeric post arrays. The ultimate configuration would be a cube or other polyhedron with elastomeric post arrays attached to all surfaces, e.g., six in the case of a cube. In any case, it can be seen that as more and more of the instrument 11 body surface is used for attachment, the elastomeric post array mounting structure approaches an ideal low-stress distribution of floation in a fluid, without the additional problems related to incorporation of a fluid and a floatation chamber.

Figure 2:
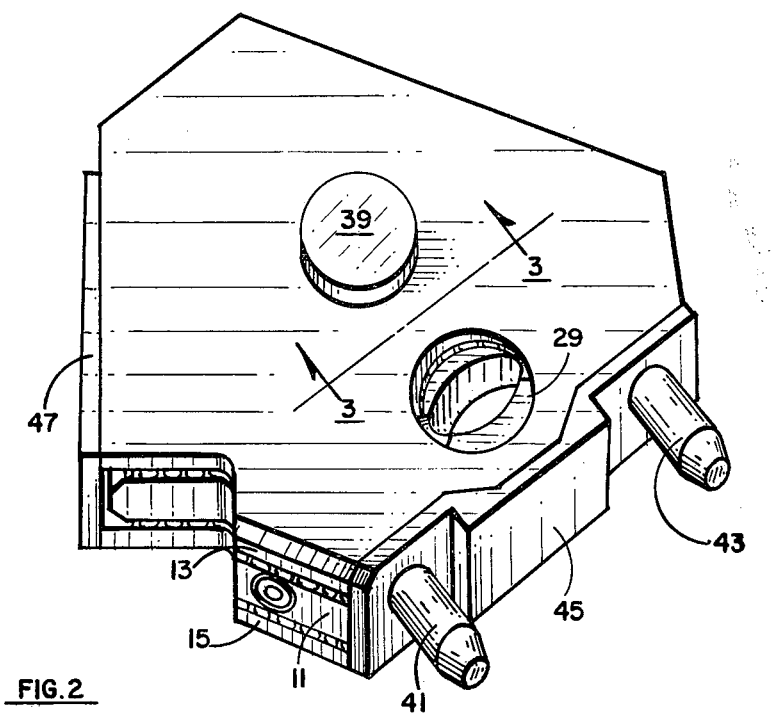
FIG. 2 illustrates the components of FIG. 1 mounted into an assembly, with cathodes mounted on the ring laser gyroscope and with optional side panels.

FIG. 2 illustrates more than one surface of the body of the gyroscope instrument 11 being used for elastomeric post array mounting. More specifically, FIG. 2 illustrates the components of FIG. 1 mounted into a composite assembly with the mounting post 39 inserted. In addition, cathodes 41 and 43 of the gyroscope 11 are shown mounted through holes (not shown) in a contoured optional side panel or plate 45 into the gyroscope 11. A further optional straight side panel or plate 47 is also illustrated in FIG. 2. Each of the optional panels 45 and 47 can be coupled or bolted to the edges of the sections 13 and 15 without directly touching the body of the ring laser gyroscope 11. The illustrated optional side panels 45 and 47, as well as any additional desired side panels (not shown) may also be made from a light metal, such as beryllium or aluminum.

The optional panels 45 and 47 may, if desired, also have elastomeric post arrays molded onto their inner surfaces (not shown) which mate with the body of the instrument 11 for additional support. The rigid support sections 13 and 15 may be either a continuous fixed structure (like the structure shown in FIG. 2 with the optional panels 45 and 47 being utilized) or a separated structure (like that shown in FIG. 1). If the rigid support sections 13 and 15 are coupled together to form a continuous fixed structure, thermal expansion effects of both the rigid support material and the elastomeric post material tend to become constrained and can apply additional stresses on the body of the instrument 11.

These stresses, as any others, will be substantially absorbed in the arrays of posts 25 and 27, and may be negligible in many applications. If these additional stresses must be avoided, then the rigid supports for different surfaces can be separate pieces, which are linked together by way of an appropriate thermal compensation mechanism, such as the mounting post 39

(FIG. 1). Essentially, the thermal compensation mechanism or mounting post 39 in the linkage could be arranged or constructed to move the rigid supports apart in correspondence with the thermal expansion of the elastomeric material, which typically would have a much larger thermal expansion coefficient than other materials in the overall mounting structure.

Each of the elastomeric post arrays of posts 25 and 27 has the special property of absorbing most of any applied stress within its own structure and transmitting only a small fraction of the applied stress to the body of the instrument 11 being suspended. This is due to the fact that each discrete post 25 (or 27) in an array can deflect or distort independently of the others, and because the shape and density of the posts 25 can be selected for optimum values of shear, tensile and compressive strengths.

For example, when the ambient temperature increases and the rigid support section 15 expands considerably more than the very low thermal expansion material used for the body of the laser gyroscope instrument 11, the elastomeric posts 25 individually adjust to match the differential expansion. In the center of the mounting area, where there is no relative motion between the rigid support section 15 and the gyroscope 11 body, the elastomeric posts 25 individually adjust to match the differential expansion. In the center of the mounting area, where there is no relative motion between the rigid support section 15 and the gyroscope 11 body, the elastomeric posts 25 will remain substantially perpendicular to the opposing surfaces 19 and 23. However, progressively further down from the central area, as the relative displacement between the rigid support section 15 and the gyroscope 11 body increases, the individual posts 25 will bend more and more at an angle between the two surfaces 19 and 23, since the ends of each post 25 must remain where they were originally bonded. But the very fact that the individual posts 25 can bend, stretch or compress, in response to relative motion between the surfaces 19 and 23 to which the opposite ends of the posts 25 are attached, means that relatively little stress is applied to either of the surfaces 19 and 23.

Thus, the delicate gyroscope instrument or device 11 can be securely suspended to one or more of the sections 13 and 15 because of the cumulative strength of the large number of elastomeric posts in the associated array or arrays of posts. At the same time any stresses transmitted to, for example, the section 15 are greatly reduced because the individual posts 25 separately change shape and comply with relative motion between the surfaces 19 and 23 which are effectively joined by the array of posts 25. Moreover, there is virtually no tendency of the suspended instrument 11, as a whole, to vibrate within the elastomeric post array mounting structure comprised of the array of elastomeric posts 25 bonded to the section 15, which structure is in turn bonded to the instrument 11. This is due to the fact that the elastomeric material of the posts 25 has very strong damping characteristics and does not tend to sustain oscillations as can the prior art spring mounting technique previously discussed.

The mechanical properties of an elastomeric post array mounting structure depend on the elastomeric material used, the geometry (shape) of the individual posts, the spatial density of the posts in the array, and on the rigid support material used. In general, the stiffness with which the mounting structure suspends or holds the body of the instrument 11 can be increased by utilizing: an elastomeric material with a higher elastic module; posts with a smaller length-to-cross-section-area ratio; and/or a greater post density. Conversely, the mounting stiffness can be decreased by a lower elastic moduli; longer or slimmer posts; and/or more separation between posts.

The geometry of the posts has the greatest effect on the mechanical properties of the mounting structure. For example, if the posts were essentially of infinite diameter, e.g., a continuous sheet of elastomeric material, the mounting structure would not achieve the desired low-stress holding. In a continuous sheet, elastomeric materials exhibit high thermal expansion and very low compressibility. It is only in an array of separate posts that the necessary flexibility in shear and compressive characteristics can be achieved.

Generally, the post array can be made progressively softer and more compliant in both compression and shear by increasing the ratio of post length to post diameter. These effects are not linear but change rapidly at length-to-diameter ratios above about 1 to 2. Ratios on the order of 1 to 1, or slightly greater, give a balance between shear and compressive strengths which are suitable for laser gyroscope mounting. With a given length-to-diameter ratio of posts, the actual magnitudes of shear and compressive strengths can be proportionally adjusted by changing the density of the posts in the array.

An exemplary material which provides suitable properties and, therefore, can be used in fabricating the arrays of elastomeric posts 25 and 27 is a silicone rubber, which, for example, is manufactured by General Electric with the part number of SE 5504. This silicon rubber can be molded directly onto the rigid support sections or plates 13 and 15. The molding can, for example, be carried out by first putting the elastomeric compound (e.g., silicon rubber) on a sieve-like thin plate (not shown) having a thickness equal to the height of the elastomeric posts, and holes with diameters (or cross-sectioned configurations) equal to those of the posts, with the number of holes per unit area determining the density of the posts. The silicon rubber can than be squeezed through the holes in the sieve-like thin plate onto the surface 19 of the rigid support section 15 by means of a heated press to fabricate a silicon rubber pad array of posts 25. The same process is repeated for the section 13 to fabricate a silicon rubber pad array of posts 27. The elastomeric material, such as the silicon rubber, will form good bonds to the rigid support plates 13 and 15. The arrays of elastomeric posts 25 and 27 can then be respectively bonded to the surfaces 23 and 21 of the instrument or device 11 with, for example, a room-temperature-curing, silicon adhesive, such as General Electric's RTV 103.

Another way that an array of elastomeric posts could be bonded to a section (e.g. 15) is to fabricate a thin sheet of elastomeric material containing the posts and bond the thin sheet and posts to the section (e.g., 15).

Figure 3:
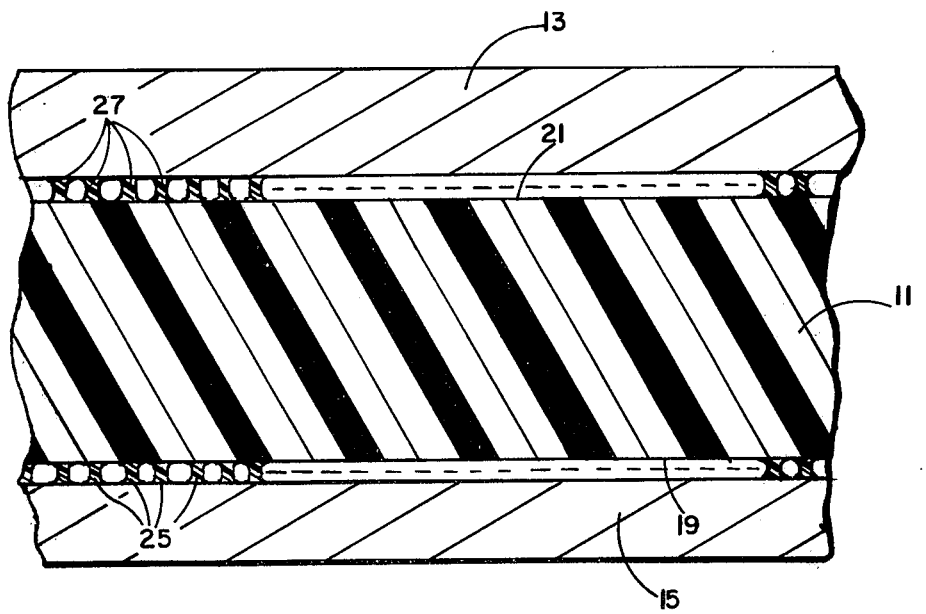
FIG. 3 illustrates a cross-sectional view along the line 3—3 of FIG. 2.

FIG. 3 illustrates a cross-sectional view of the assembly of FIG. 2 taken along the line 3—3. In this figure, the sections 13 and 15 are more clearly shown mounted or attached to the top and bottom surfaces 21 and 19 of the instrument 11 by means of the arrays of elastomeric posts 27 and 25, respectively.

In an illustrative example, the post diameters may be about 0.025 inch; the total column length of each of the posts 25 and 27, including the molded posts and adhesive bond line may be from 0.035 to 0.038 inch; and the density of the elastomeric posts may be 290 posts per square inch. Measurements on test specimens prepared with this post array configuration gave shear strengths just under 1.0 lbs/mil/inch$^2$ and compressive strengths about 2.0 lbs/mil/inch$^2$. The ultimate shear strength of this post array was measured to be over 100 lbs/inch$^2$, which illustrates the very great holding ability of the elastomeric post array mounting structure.

Calculations based on the measured values given above indicate that, with the elastomeric post array mounting structure shown in FIG. 2, there would only be a few tenths of a microinch distortion of the body of the ring laser gyroscope 11 in any direction as a result of thermal expansion differences over a ± 100° Fahrenheit (F) temperature range. This illustrates the effectiveness of the elastomeric post array structure for the ultra-low-stress mounting of a ring laser gyroscope, or of a similar delicate instrument or device.

The thermal resistance of the elastomeric post array layer is an important factor in mounting any instrument, such as a ring laser gyroscope which has an internal power requirement and/or a temperature control requirement. This is because the elastomeric post array layer is the only direct pathway for conductive heat transfer to and from the instrument body. Thermal resistance test measurements on a post array of SE 5504 elastomeric material indicate that there would only need to be a temperature drop of 5 to 7° Fahrenheit across the post array layer to dissipate the excess heat generated in a typical laser gyroscope body.

The invention thus provides an elastomeric post array mounting structure which can be used for the ultra-low-stress mounting of any dimensionally critical instrument or device to enable the mounting forces to be distributed over large areas of the surface of the instrument to avoid stress concentrations. In a preferred embodiment of the invention, an array of separate elastomeric posts of preselected shape and spacing is utilized to attach part or all of the body surface of the instrument or device to one or more rigid support sections.

While the salient features have been illustrated, and described in a preferred embodiment of the invention, it should be readily apparent to those skilled in the art that many changes and modifications can be made in the preferred embodiment without departing from the spirit and scope of the invention. It is therefore intended to cover all such changes and modifications of the invention that fall within the spirit and scope of the invention as set forth in the appended claims.

What is claimed is:

1. An elastomeric post array mounting structure for suspending a precision device in any of a plurality of omnidirectional positions while minimizing the transmission of external stresses to the precision device, said structure comprising:
   a first rigid support section having a first surface;
   a first array of separate elastomeric first posts, each of said first posts having a first end attached to said first surface of said first rigid support section and a second end attached to a first surface of the precision device, each of said posts having a preselected cross-sectional-area and a preselected length between said first and second ends to achieve desired shear, tensile and compressive strengths for said mounting structure, said first array of separate elastomeric first posts acting collectively to suspend the precision device in a substantially fixed position relative to said first rigid support section for all orientations of said first rigid support section while minimizing the transmission of shear, tensile and compressive stresses to the precision device;
   a second rigid support section having a second surface; and
   a second array of separate elastomeric second posts, each of said second posts have a third end attached to said second surface of said second rigid support section and a fourth end attached to a second surface of the precision device.

2. The elastomeric post array mounting structure of claim 1 further including:
   first means, coupled between said first and second rigid support sections without directly contacting the precision device, for providing additional support to said structure.

3. The elastomeric post array mounting structure of claim 1 wherein:
   said first and second surfaces of said first and second rigid support sections have configurations substantially mateable with the first and second surfaces, respectively, of the precision device.

4. The elastomeric post array mounting structure of claim 1 wherein:
   said first and second posts are made of silicone rubber; and
   said first and second rigid support sections are made of metal.

5. The elastomeric post array mounting structure of claim 4 wherein:
   said first and second rigid support sections are made of beryllium.

6. The elastomeric post array mounting structure of claim 4 wherein:
   said first and second support sections are made of aluminum.

7. The elastomeric post array mounting structure of claim 1 further including:
   means coupled to said first and second rigid support sections for moving said rigid support sections further away from each other as a function of the thermal expansion of said first and second arrays and for moving said rigid support sections closer toward each other as a function of the thermal contraction of said first and second arrays.

* * * * *